3,072,726
N¹-CYCLOALKANOYL AND N¹-[ALPHA-TRI-ALKYL]-ALKANOYL-HYDRAZIDES AND DERIVATIVES THEREOF
Hugo Gutmann, Reinach, Basel-Land, and Paul Zeller, Allschwil, Switzerland, assignors to Hoffmann-La Roche Inc., Nutley, N.J., a corporation of New Jersey
No Drawing. Filed Aug. 12, 1960, Ser. No. 49,160
Claims priority, application Switzerland Aug. 24, 1959
17 Claims. (Cl. 260—562)

This invention relates to $N^1,N^2$-disubstituted acid hydrazides. More particularly, the invention relates to acid hydrazides having the general formula

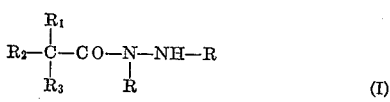

wherein one R represents lower alkyl and the other R represents phenyl lower alkylene, $R_1$ and $R_2$ represent individually lower alkyl groups or join together to form a lower alkylene residue, and $R_3$ represents lower alkyl, and salts of such compounds.

The lower alkyl groups represented by R, $R_1$, $R_2$ and $R_3$ in the above formula are straight chain and branched chain saturated aliphatic groups such as methyl, ethyl, propyl, isopropyl, butyl, isobutyl, t-butyl, amyl, isoamyl, hexyl, heptyl, etc. The groups $R_1$ and $R_2$ in addition may be joined together in a lower alkylene moiety which, together with the carbon atom to which they are attached (adjacent to the carbonyl group), form an alicyclic group having 3 to 6 carbon atoms, i.e. cyclopropane, cyclobutane, cyclopentane or cyclohexane. R also represents a phenyl lower alkylene group which includes, for example, benzyl, α-methylbenzyl, phenethyl, α-methylphenethyl and the like. Preferred among the compounds described above are those which are derived from pivalic acid or from 1-methylcyclopropanecarboxylic acid and wherein one of the groups represented by R is the isopropyl group and the other group represented by R is a benzyl group.

The compounds of Formula I may be produced by any one of several methods. An acid having the general formula

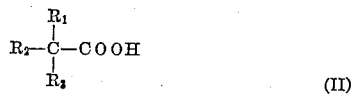

wherein $R_1$, $R_2$ and $R_3$ have the same significance as in Formula I, or a functional derivative thereof, may be reacted with a hydrazine of the general formula $$R'—NH—NH—R' \qquad (III)$$

wherein R′ has the same significance as R in Formula I and may also represent hydrogen.

Alternatively, an acid of Formula II, or a functional derivative thereof, may be condensed with a hydrazone of the general formula $$R'—NH—N=R'' \qquad (IV)$$

wherein R′ has the same significance as in Formula III and R″ represents a divalent group corresponding to R, and hydrogenating the resulting condensation product.

According to still another alternative, a nitroso group may be introduced, e.g. with nitrous acid, into an acid amide having the general formula

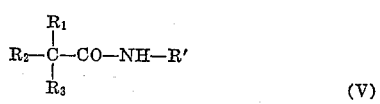

wherein R′, $R_1$, $R_2$ and $R_3$ have the same significance as described above. The nitroso group is then reduced to the amino group and finally the group R is introduced.

In the reaction of the acid of Formula II or its functional derivative with the hydrazine of Formula III or the hydrazone of Formula IV, the reactants are preferably used in equimolar proportions in the presence of a solvent. If the free acid is used to react with a mono-substituted hydrazine or hydrazone, the condensation is preferably effected in the presence of a carbodiimide such as N,N′-dicyclohexylcarbodiimide. In such a reaction urea derivatives corresponding to the carbodiimide are formed as byproducts which are readily separated from the reaction mixture. This reaction may be effected at a temperature between about 0° and 50° C., preferably at room temperature or a slightly elevated temperature.

Reactive derivatives of the acids of Formula II include for example acid halides, especially the acid chloride, esters or anhydrides. Acid anhydrides include those formed from two molecules of the acid containing the desired acyl group. They may be symmetrical anhydrides or mixed anhydrides with lower alkane carboxylic acids or carbonic acid mono esters.

If a hydrazone is used in the initial reaction, the azomethine resulting from the condensation may be catalytically hydrogenated in the presence of a catalyst such as platinum or palladium black or may be reduced with lithinum aluminum hydride.

If R′ represents a hydrogen atom the substituent represented by the symbol R may be introduced by reacting the acid hydrazide with a compound yielding the group R, for example ethyl bromide, benzyl chloride, isopropyl iodide, methyl tosylate or dimethyl sulfate. Such a reaction may be carried out in the presence of a base, for example an alkali metal alcoholate, especially sodium ethylate, an alkali metal amide, alkali metal hydride, alkali metal or a tertiary organic base such as pyridine.

In order to introduce the substituents represented by R on the $N^2$-atom, it is also possible to react the hydrazine with a carbonyl compound and then reduce the resulting hydrazone either catalytically in the presence of platinum or palladium-carbon catalyst or chemically by reaction with lithium aluminum hydride. Carbonyl compounds which may be used in such a reaction include for example acetone, methyl ethyl ketone, benzaldehyde or acetophenone.

The substituted acid hydrazides of this invention form well defined salts with inorganic as well as with organic acids, for example with hydrohalic acids, such as hydrochloric acid, hydrobromic acid, hydroiodic acid, etc., with other mineral acids such as sulfuric acid, phosphoric acid, nitric acid, and with organic acids such as tartaric acid, citric acid, camphorsulfonic acid, ethanesulfonic acid, salicyclic acid, ascorbic acid, maleic acid, mandelic acid, etc. Preferred salts are the hydrohalides, particularly the hydrochloride. The acid addition salts may be produced by treating the hydrazine derivative in an inert solvent with an excess of the acid corresponding to the salt desired.

The products of this invention are mono-amine oxidase inhibitors which deactivate physiological regulators such as serotonin, tryptamine, epinephrine, etc., and thereby stimulate the central nervous system. They are useful as antidepressants and also serve to increase weight in cases of cachexia. The free hydrazine compound or a medicinally acceptable acid addition salt may be administered orally or parenterally in solid or liquid dosage forms such as tablets, capsules, injectables, elixirs and the like, prepared by mixing therapeutic dosages of the hydrazine or salt with the carrier, excipient or the like according to conventional pharmaceutical practice.

The following examples serve to illustrate the invention. All temperatures are given in degrees centigrade.

Example 1

To a solution of 40 g. of isopropylhydrazine in 500 ml. of ether were added 55 g. of benzaldehyde over a period of five minutes. The mixture was heated under reflux for one hour separating the water formed in the reaction. The ether solution was dried over sodium sulfate and concentrated. The residue was fractionated in vacuo. The fraction boiling at 50–60°/0.01 mm. contained the $N^1$-isopropyl-$N^2$-benzylidenehydrazine. 34 g. of this fraction were mixed with 35 ml. of pyridine and 250 ml. of absolute benzene. 25 g. of pivaloyl chloride were added dropwise over a period of about 10 minutes whereupon the temperature rose somewhat and pyridine hydrochloride crystallized out. The mixture was heated under reflux for one hour and filtered. The filtrate was washed with saturated sodium bicarbonate solution, dried over sodium sulfate and the benzene was distilled off. The residue was crystallized from petroleum ether to obtain $N^1$-pivaloyl-$N^1$-isopropyl-$N^2$-benzylidenehydrazine melting at 80–81°.

30 g. of the product obtained above were hydrogenated in 200 ml. of methanol in the presence of palladium-black catalyst until an equivalent proportion of hydrogen was absorbed. The residue was distilled in vacuo. The principal proportion distilled at 87–89°/0.04 mm. and consisted of $N^1$-pivaloyl-$N^1$-isopropyl-$N^2$-benzylhydrazine, $n_D^{27}=1.5026$.

The distillate obtained above was admixed with an equivalent proportion of alcoholic hydrochloric acid and the mixture was then diluted with ether. $N^1$-pivaloyl-$N^1$-isopropyl-$N^2$-benzylhydrazine hydrochloride crystallized, M.P. 156–158° (dec.).

Example 2

1 ml. of glacial acetic acid was added to a mixture of 93 g. of acetophenone and 63 g. of isopropylhydrazine and the mixture was heated for two hours on a water bath. After 10 minutes, water began to separate. The reaction product was then cooled and a small amount of ether was added in order to facilitate the separation of the water formed in the reaction. The crude condensation product was dried over sodium sulfate and then distilled to obtain pure $N^1$-isopropyl-$N^2$-($\alpha$-methylbenzylidene)hydrazine, B.P. 132–136°/18 mm., $n_D^{22}=1.5525$. 37 g. of this product were dissolved in a mixture of 35 ml. of pyridine and 250 ml. of benzene and to the solution were added 25 g. of pivaloyl chloride. The mixture was heated and pyridine hydrochloride began to separate. By boiling for one hour the reaction was brought to completion. After cooling the reaction mixture, the precipitate was filtered off and the filtrate was washed with sodium bicarbonate solution and with saturated sodium chloride solution, then concentrated. The residue was fractionated under high vacuum to obtain $N^1$-isopropyl-$N^1$-pivaloyl-$N^2$-$\alpha$-methylbenzylidenehydrazine, B.P. 98°/0.03 mm., $n_D^{26}=1.5274$.

The product was hydrogenated by the same procedure as described in Example 1 to obtain $N^1$-isopropyl-$N^1$-pivaloyl-$N^2$-$\alpha$-methylbenzylhydrazine as a viscous oil, B.P. 87°/0.05 mm., $n_D^{26}=1.5020$.

Example 3

20 g. of benzylhydrazine were mixed with 70 ml. of acetone and heated under reflux for ½ hour. The excess acetone was then distilled off and the residue was fractionated to obtain $N^1$-benzyl-$N^2$-isopropylidenehydrazine, B.P. 120°/10 mm., $n_D^{24}=1.5385$.

15.1 g. of the product obtained above were dissolved in a mixture of 15.5 ml. of pyridine and 110 ml. of benzene, then 11.1 g. of pivaloyl chloride were added. After boiling for one hour, the reaction mixture was cooled, the precipitated pyridine hydrochloride was filtered off and the filtrate was washed with sodium bicarbonate solution and with saturated sodium chloride solution. After concentrating the benzene solution, the residue was distilled to obtain $N^1$-benzyl-$N^1$-pivaloyl-$N^2$-isopropylidenehydrazine, B.P. 99°/0.03 mm., $n_D^{26}=1.5190$.

This product was hydrogenated by the procedure described in Example 1 to obtain $N^1$-benzyl-$N^1$-pivaloyl-$N^2$-isopropylhydrazine as a viscous oil.

By the procedure described above, the following hydrazine derivatives are obtained.

$N^1$-pivaloyl-$N^1$-ethyl-$N^2$-phenethylhydrazine
$N^1$-pivaloyl-$N^1$-($\alpha$-methylphenethyl)-$N^2$-isopropylhydrazine
$N^1$-(1-methylcyclopropanecarbonyl)-$N^1$-isopropyl-$N^2$-benzylhydrazine
$N^1$-(1-methylcyclopropanecarbonyl)-$N^1$-benzyl-$N^2$-isopropylhydrazine
$N^1$-(1-methylcyclopropanecarbonyl)-$N^1$-($\alpha$-methylbenzyl)-$N^2$-isopropylhydrazine
$N^1$-(1-methylcyclopropanecarbonyl)-$N^1$-isopropyl-$N^2$-($\alpha$-methylphenethyl)hydrazine.

We claim:

1. A compound selected from the group consisting of hydrazines of the formula

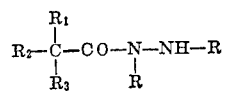

wherein one R represents lower alkyl and the other R represent phenyl lower alkylene, $R_1$ and $R_2$ represent a member of the group consisting of lower alkyl individually and lower alkylene jointly, and $R_3$ represent lower alkyl, and medicinally acceptable acid addition salts thereof.

2. A compound of the formula

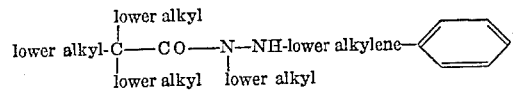

3. A compound of the formula

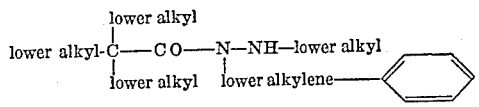

4. $N^1$-pivaloyl-$N^1$-benzyl-$N^2$-isopropylhydrazine.
5. $N^1$-pivaloyl-$N^1$-($\alpha$-methylbenzyl)-$N^2$-isopropylhydrazine.
6. $N^1$-pivaloyl-$N^1$-phenethyl-$N^2$-isopropylhydrazine.
7. $N^1$-pivaloyl-$N^1$-isopropyl-$N^2$-benzylhydrazine.
8. $N^1$-pivaloyl-$N^1$-isopropyl-$N^2$-($\alpha$-methylbenzyl)-hydrazine.
9. $N^1$-pivaloyl-$N^1$-isopropyl-$N^2$-phenethylhydrazine.
10. $N^1$-(1-methylcyclopropanecarbonyl)-$N^1$-benzyl-$N^2$-isopropylhydrazine.
11. $N^1$-(1-methylcyclopropanecarbonyl)-$N^1$-($\alpha$-methylbenzyl)-$N^2$-isopropylhydrazine.
12. $N^1$-(1-methylcyclopropanecarbonyl)-$N^1$-phenethyl-$N^2$-isopropylhydrazine.
13. $N^1$-(1-methylcyclopropanecarbonyl)-$N^1$-isopropyl-$N^2$-benzylhydrazine.
14. $N^1$-(1-methylcyclopropanecarbonyl)-$N^1$-isopropyl-$N^2$-($\alpha$methylbenzyl)hydrazine.
15. $N^1$-(1-methylcyclopropanecarbonyl)-$N^1$-isopropyl-$N^2$-phenethylhydrazine.
16. A compound of the formula

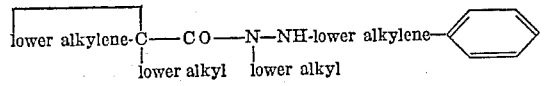

17. A compound of the formula
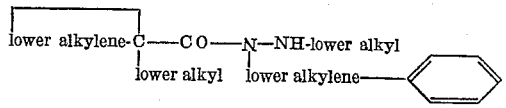
References Cited in the file of this patent
UNITED STATES PATENTS
| | | |
|---|---|---|
| 2,928,875 | Martin et al. | Apr. 5, 1960 |
| 2,931,811 | Hallmann | Apr. 5, 1960 |
| 2,934,539 | Gutmann et al. | Apr. 26, 1960 |
FOREIGN PATENTS
| | | |
|---|---|---|
| 1,204,740 | France | Jan. 27, 1960 |
| 833,908 | Great Britain | May 4, 1960 |
OTHER REFERENCES
Zeller et al.: Annals of New York Academy of Science, vol. 80, Art. 3, September 17, 1959.